United States Patent [19]
Mitchell et al.

[11] Patent Number: 5,680,663
[45] Date of Patent: *Oct. 28, 1997

[54] METHOD AND APPARATUS FOR COOKING AND DISPENSING STARCH

[76] Inventors: Wesley Wayne Mitchell, 2701 Brushy Creek Trail, Mesquite, Tex. 75181; Wilson Wayne Mitchell, 3801 Hickox Rd., Rowlett, Tex. 75088

[*] Notice: The term of this patent shall not extend beyond the expiration date of Pat. No. 5,437,169.

[21] Appl. No.: 496,369

[22] Filed: Jun. 29, 1995

Related U.S. Application Data

[63] Continuation-in-part of Ser. No. 192,559, Feb. 7, 1994, Pat. No. 5,437,169.

[51] Int. Cl.$^6$ ............................................. D06F 39/08
[52] U.S. Cl. .................... 8/159; 68/17 R; 68/207; 127/28
[58] Field of Search ............................. 68/17 R, 207; 127/28; 134/93; 137/268

[56] References Cited

U.S. PATENT DOCUMENTS

| | | | |
|---|---|---|---|
| 1,157,538 | 10/1915 | Tyler. | |
| 1,190,690 | 7/1916 | Tyler. | |
| 2,202,573 | 5/1940 | Coppock | 127/28 |
| 2,253,262 | 8/1941 | Bierly | 127/28 |
| 2,871,146 | 1/1959 | Etheridge | 127/28 |
| 2,871,147 | 1/1959 | Smith | 127/40 |
| 3,101,284 | 8/1963 | Etheridge | 127/69 |
| 3,169,083 | 2/1965 | Taylor | 127/71 |
| 3,234,046 | 2/1966 | Etheridge | 127/28 |
| 3,276,907 | 10/1966 | Huber et al. | 127/28 |
| 3,424,613 | 1/1969 | Huber et al. | 127/28 |
| 3,446,664 | 5/1969 | Komai | 127/28 |
| 3,485,666 | 12/1969 | Sterling et al. | 117/230 |
| 3,485,667 | 12/1969 | Maurer | 127/28 |
| 3,485,668 | 12/1969 | Kunze | 127/71 |
| 3,485,669 | 12/1969 | Kunze | 127/71 |
| 3,661,640 | 5/1972 | Griffith et al. | 127/28 |

*Primary Examiner*—Frankie L. Stinson
*Attorney, Agent, or Firm*—Carla J. Dolce

[57] ABSTRACT

A method and apparatus for cooking a single batch of starch solution and dispensing the solution to a commercial laundry machine utilizes a single batch reservoir. The reservoir is substantially filled with water, the water in the reservoir agitated while adding dry starch to form a starch suspension. The starch suspension is heated to cook the starch to form a starch solution. The entire batch of starch solution is dispensed to a commercial laundry machine while water is sprayed into the reservoir to clean residual starch from the reservoir.

20 Claims, 3 Drawing Sheets

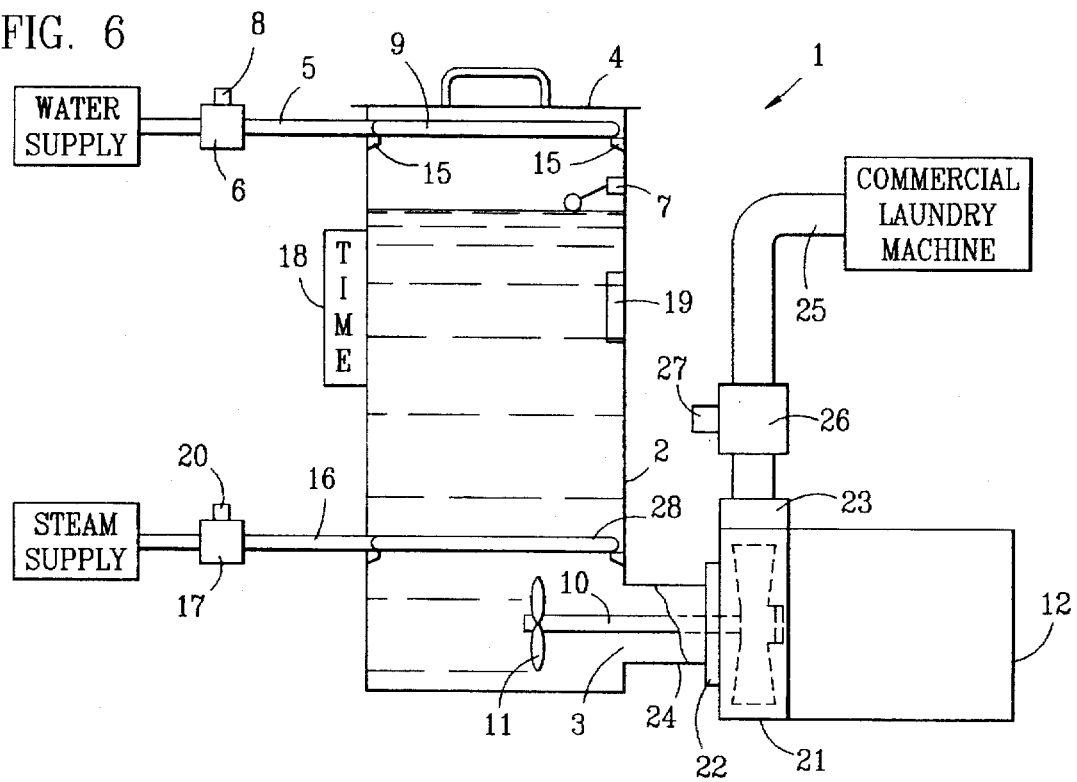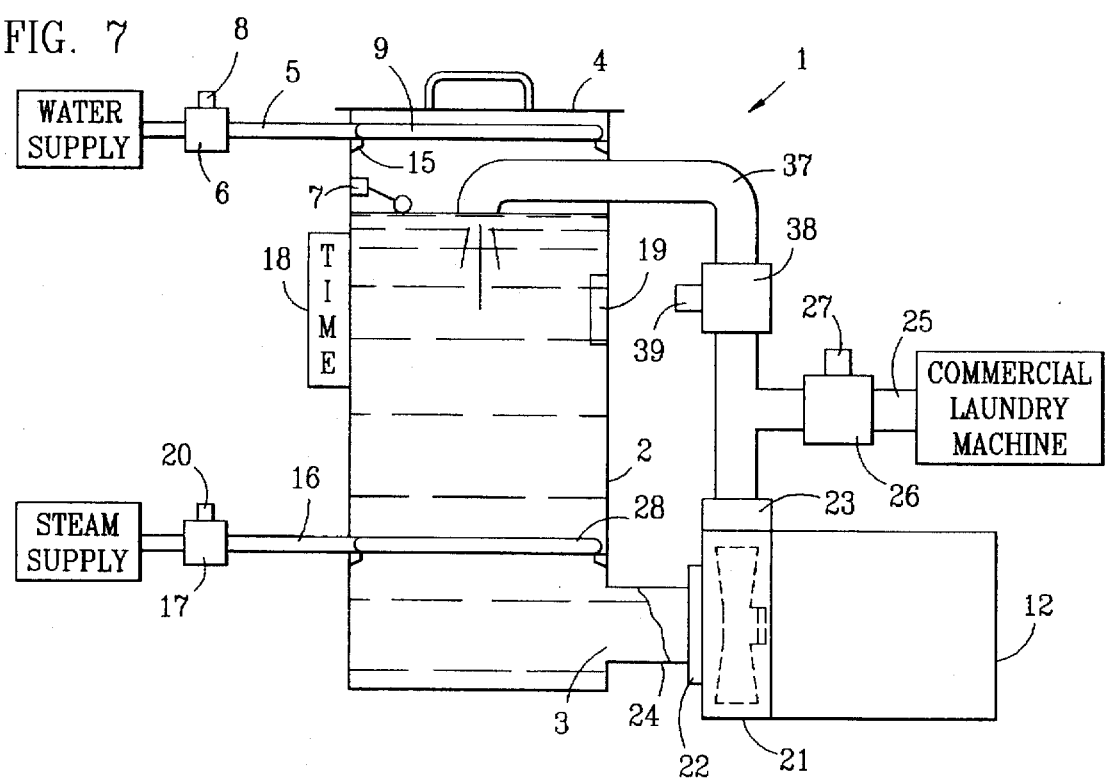

METHOD AND APPARATUS FOR COOKING AND DISPENSING STARCH

RELATED APPLICATION

This is a continuation in part of application Ser. No. 08/192,559, filed Feb. 7, 1994, now U.S. Pat. No. 5,437,169.

BACKGROUND OF THE INVENTION

1. Field of the Invention

The present invention relates to a method and apparatus for cooking single batches of starch and completely dispensing each single batch in a single discharge to one or more commercial laundry machines as needed.

2. Description of Related Art

In most modern commercial laundries, starch is added to the commercial laundry machines either by adding a precooked dry starch or a liquid synthetic starch directly to the machines as needed. Both precooked and synthetic starch are significantly more expensive than uncooked starch, which is sometimes referred to as "pearl starch". Additionally, precooked starch frequently does not dissolve completely leaving starch specks on the garments as well as causing starch build-up on the press heads when the garments are pressed. To avoid the expense of precooked starch some commercial laundries add uncooked starch directly to the laundry machines. The uncooked starch is later cooked when the garment is pressed. Although this method reduces starch costs, it causes starch buildup on the press heads and results in uneven starching of the garments.

To reduce the costs of using precooked dry starch or synthetic starch and to avoid the problems with using uncooked starch, some commercial laundries use existing starch cookers in which a large vat of starch solution is cooked and then drawn from the vat manually. Some examples of existing starch cookers can be seen in U.S. Pat. No. 2,253,262 to Bierly, U.S. Pat No. 1,418,320 to Miller, or U.S. Pat. No. 1,190,690 to Tyler.

The problems of existing starch cookers include insufficient agitation resulting in lumpy starch, inferior starching and starch build-up on press heads; overcooking the starch resulting in inferior starching of the garments; fouling of unused starch and employee dangers from the manual transfer of hot starch solution from the starch cooker to the laundry machine. These problems were first addressed by the single-batch starch cooking and dispensing apparatus described in the application to which this application relates—application Ser. No. 08/192,559. A method and additional refinements and improvements are disclosed herein.

SUMMARY OF THE INVENTION

It is a first object of the present invention to provide a method and apparatus for use in commercial laundries that cooks single batches of starch so that all of the starch in each batch is discharged in a single discharge which may be to one or more laundry machines.

It is a second object of the present invention to provide a method and apparatus that includes means for agitating the starch solution that minimizes or eliminates the formation of lumps while being economical to manufacture and operate.

It is a third object of the present invention to provide a starch cooking and dispensing apparatus that is self-cleaning.

It is a fourth object of the present invention to provide a starch cooking and dispensing apparatus that is economical because it allows commercial laundries to use uncooked ("pearl") starch and eliminates or nearly eliminates any waste of starch.

The foregoing objects and other objectives, features and advantages of the invention will be more readily understood from the following brief summary of the invention and the detailed description of preferred embodiments set forth below.

The present invention relates to a commercial starch cooking and dispensing apparatus comprising a reservoir having capacity for holding a single batch of starch solution; means for substantially filling the reservoir with water; means for agitating the water in the reservoir; means for dispensing dry starch into the water in the reservoir to form a starch suspension; means for heating the starch suspension to dissolve the starch to create a starch solution; and means for dispensing the starch solution from the reservoir into the commercial laundry machine. The apparatus may be cleaned after each batch of starch is dispensed by permitting clean water to wash through the reservoir and other parts of the apparatus as the starch solution is being dispensed.

The present invention also relates to a method of cooking and dispensing single batches of starch solution including the steps of filling a reservoir substantially full with water; agitating the water in the reservoir; dispensing dry starch into the water in the reservoir to form a starch suspension; heating the starch suspension to dissolve the starch to create a batch of starch solution; discharging the entire batch of starch solution in a single discharge to the laundry machine; and cleaning the starch solution from the reservoir.

BRIEF DESCRIPTION OF THE DRAWINGS

FIG. 6 is a vertical sectional view of an additional embodiment of the apparatus.

FIG. 7 is a vertical sectional view of another embodiment of the apparatus wherein the mixing of the starch with water is accomplished by recirculation of the starch solution.

DESCRIPTION OF THE PREFERRED EMBODIMENTS

The preferred embodiments of the invention are described with reference to the FIGS. 1, 2, 3, 4, 5, 6 and 7, wherein like numbers represent like parts.

Figure 1:
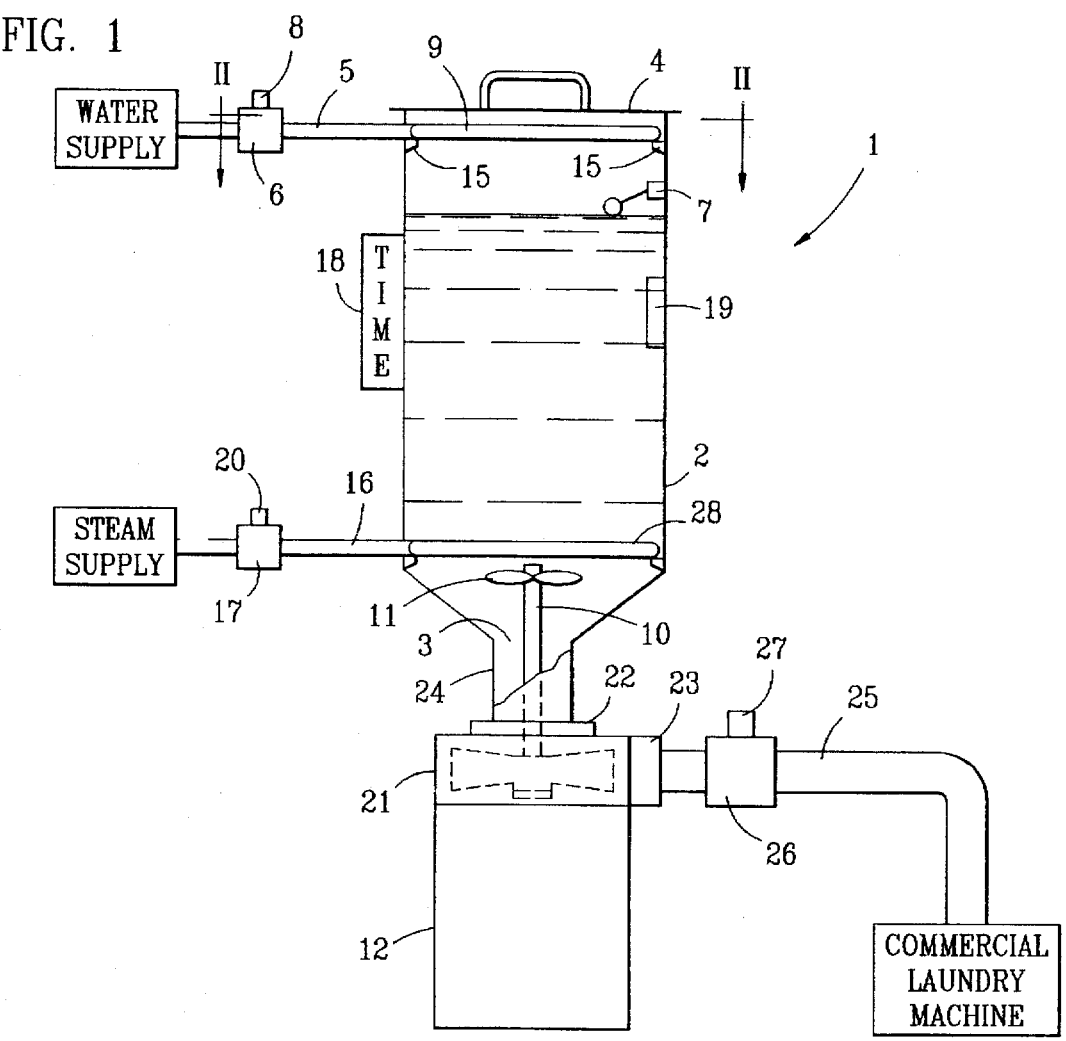
FIG. 1 is a vertical sectional view of one embodiment of the apparatus
Figure 2:
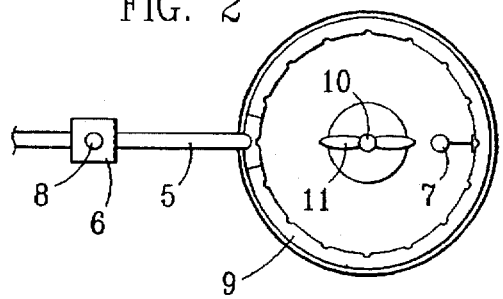
FIG. 2 is a horizontal sectional view of the apparatus as depicted in FIG. 1 on the line II—II.
Figure 4:
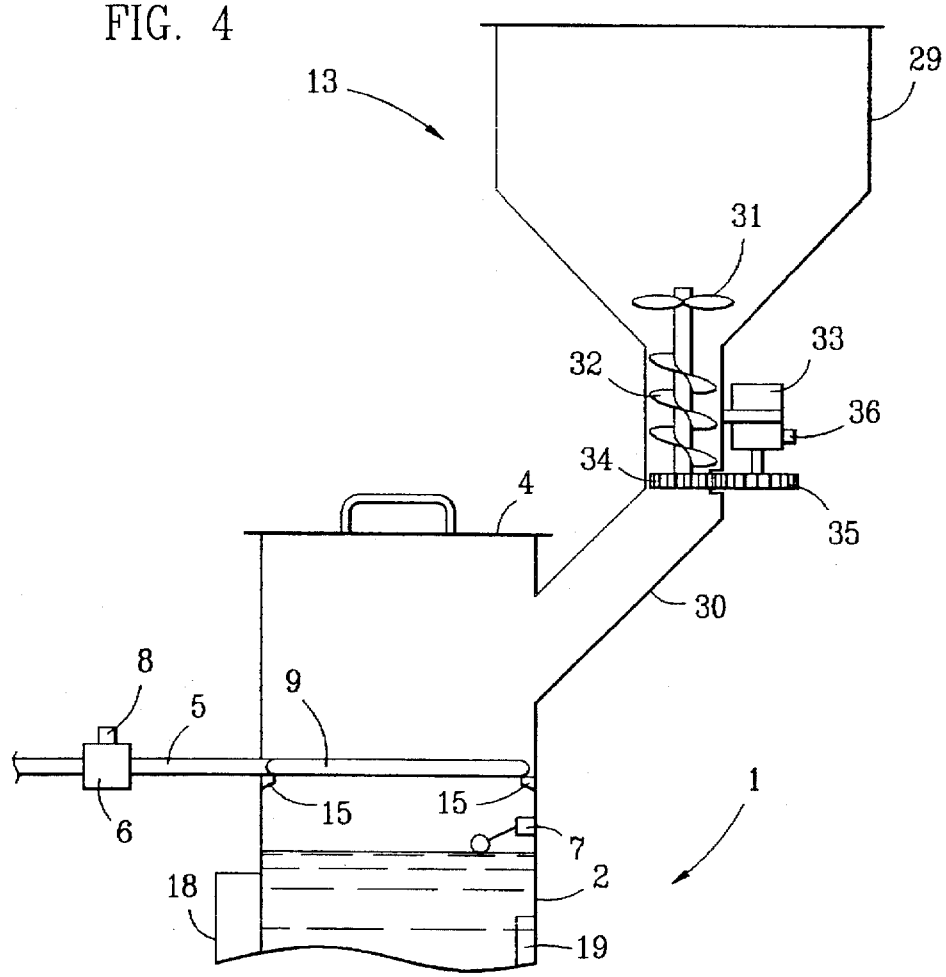
FIG. 4 is a partial vertical sectional view of an alternative embodiment of the apparatus having an automatic powdered product dispenser.
Figure 5:
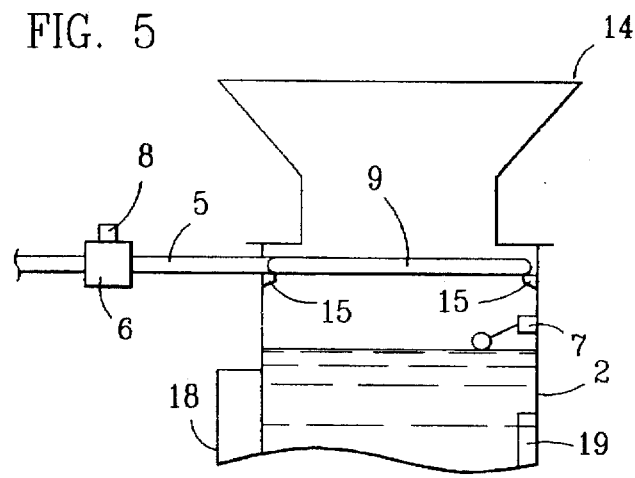
FIG. 5 is a partial vertical sectional view of an alternative embodiment of the apparatus having a chute for adding dry starch.

As depicted in the drawings, starch cooking and dispensing apparatus 1 comprises reservoir 2, which may be of any suitable shape having capacity for holding a single batch of starch solution. Reservoir 2 is shown in FIG. 1 as a cylindrical sheet metal tank having a bottom that is cone shaped with walls that converge toward drain 3 (also referred to as the reservoir discharge opening). Reservoir 2 may be cylindrical with a flat bottom having drain 3 on a sidewall of reservoir 2 as depicted in FIGS. 6 and 7. Reservoir 2 may be open at the top; it may have loose-fitting, removable lid 4 as depicted in FIGS. 1, 4, 6 and 7; or it may have inlet chute 14 as depicted in FIG. 5. Alternatively, reservoir 2 may have automatic powdered product dispenser 13 associated with it as depicted in FIG. 4. If reservoir 2 has loose-fitting lid 4, lid 4 has one or more holes that serve as vent holes to vent excess steam. In all embodiments of the invention, a vent for excess steam is provided.

Means is provided for substantially filling reservoir 2 with water. The means for substantially filling reservoir 2 with water includes a source of water such as a municipal water supply line. As depicted in the drawings, the water source is connected to reservoir 2 by water supply conduit 5. Connected to water supply conduit 5 between the water source and reservoir 2 is water supply vane 6 which selectively opens to permit water to enter reservoir 2 or selectively closes to prevent the flow of water into reservoir 2.

The means for substantially filling reservoir 2 with water further comprises means for opening water supply valve 6 when reservoir 2 is substantially empty and for closing water supply valve 6 when reservoir 2 is substantially full. As depicted in the drawings, the means for selectively opening and closing water supply valve 6 comprises float device 7 and water supply solenoid 8. Float device 7 is associated with reservoir 2 for determining when reservoir 2 is substantially empty and when it is substantially full. Water supply solenoid 8 is an electrically energized solenoid responsive to float device 7 and connected to water supply valve 6. Water supply solenoid 8 opens water supply valve 6 when float device 7 determines that reservoir 2 is substantially empty and closes water supply valve 6 when float device 7 determines that reservoir 2 is substantially full.

Preferably, the means for selectively opening and closing water supply valve 6 comprises two electrical probes, not shown in the drawings, one of which is affixed to the top portion of reservoir 2 to detect when reservoir 2 is substantially full and one affixed to the bottom portion of reservoir 2 for detecting when reservoir 2 is substantially empty. When water entering reservoir 2 reaches the probe in the top portion of reservoir 2, a signal is sent to timing device 18 which in turn sends a signal to steam inlet solenoid 20 for opening steam inlet valve 20 for cooking the starch as discussed below. When reservoir 2 is substantially empty, the probe in the bottom portion of reservoir 2 sends a signal to timing device 18 which in turn sends a signal to water supply solenoid 8 for opening water supply valve 6. Preferably, the probes are affixed to reservoir 2 with what is commonly referred to as "JB welds."

Timing device 18 preferably comprises a microprocessor and a plurality of relays. The microprocessor measures time, receives and processes signals from the commercial laundry machine, and communicates with the plurality of relays for controlling one or more functions of starch cooking and dispensing apparatus 1. Such microprocessor timing devices are well known and readily available from companies such as Knight Equipment Corporation, 2945 Airway Ave., Costa Mesa, Calif., Nova Controls, 2121 Delaware Ave., Santa Cruz, Calif., Electronic Power Designs, 662 Myrtle Ave., Boonton, N.J., and others. Preferably, the microprocessor is custom designed specifically for a particular commercial laundry's needs. Such custom microprocessor controls are readily available from companies such as Knight Equipment Corporation.

Figure 3:
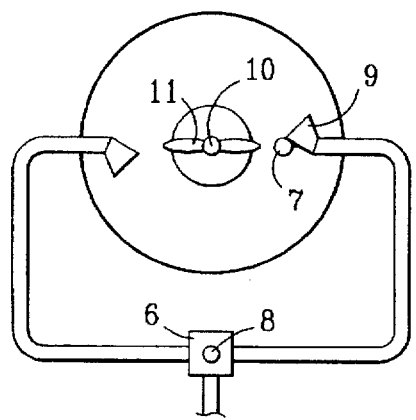
FIG. 3 is a horizontal sectional view of an alternative embodiment of the apparatus depicted in FIG. 1 on the line II—II, in which the sprayer is comprised of two sprayer heads.

As depicted in the drawings, the means for substantially filling reservoir 2 with water may further comprise sprayer 9 inside reservoir 2 and in fluid flow communication with water supply conduit 5. Sprayer 9 sprays water so as to wash the interior walls of reservoir 2 when water enters. As depicted in FIGS. 1, 2, 6 and 7, sprayer 9 may be a circular conduit having a plurality of pores along its perimeter through which water flows causing a spray of water. Sprayer 9 may be supported by sprayer supports 15 attached to reservoir 2. Alternatively, as depicted in FIG. 3, sprayer 9 may be two sprayer heads each at opposite sides of reservoir 2 and positioned so that the water spraying from the heads contacts a maximum area of the interior walls of reservoir 2. A splatter shield, not depicted in the drawings, may be provided above the sprayer to prevent starch buildup where water is not sprayed.

Starch cooking and dispensing apparatus 1 further comprises means for agitating the water to minimize the formation of lumps. The means for agitating the water in reservoir 2 may comprise a cyclically movable stirring device projecting into reservoir 2 and means for cyclically moving the stirring device to agitate the water. As depicted in FIGS. 1 and 6, the cyclically movable stirring device comprises rotatable shaft 10 extending through drain 3 and propeller 11 attached to shaft 10 for agitating the water when rotated by shaft 10. As depicted in FIGS. 1 and 6, the means for cyclically moving the stirring device may comprise electric motor 12 for rotating shaft 10 and propeller 11. Electric motor 12 may be controlled by timing device 18 which is in electrical communication with the commercial laundry machine into which the starch solution will ultimately be dispensed. After timing device 18 receives a signal from the commercial laundry machine, it relays that signal to electric motor 12 causing electric motor 12 to start.

Preferably, electric motor 12 is operating during all times that the apparatus is in operation. For example, in the preferred embodiment depicted in FIG. 7, electric motor 12 is activated as long as the apparatus is in use so that centrifugal pump 21 is either operating to recirculate fluid through recirculation conduit 37 or to discharge starch solution through discharge conduit 25.

The configuration shown in FIG. 6, having shaft 10 entering reservoir 2 substantially perpendicular to the sidewalls of reservoir 2, is preferable in that this configuration minimizes the possibility of starch build-up at the base of shaft 10. Such starch build-up may stall electric motor 12 damaging the motor.

Another alternative to minimize the build-up of starch that may damage electric motor 12 is the configuration shown in FIG. 7. As shown in FIG. 7, the means for agitating the water comprises recirculation conduit 37 extending from the bottom portion of reservoir 2 to the top portion of the reservoir. Fluid from reservoir 2 is recirculated through recirculation conduit 37 from the bottom portion of reservoir 2 to the top portion of the reservoir.

Flow through recirculation conduit 37 may be controlled by recirculation valve 38, through recirculation solenoid 39. For agitation, recirculation valve 38 is selectively open to permit flow through recirculation conduit 37 while discharge valve 26 is selectively closed to prevent flow through discharge conduit 25. To minimize sticking due to starch buildup, both recirculation valve 38 and discharge valve 26 are preferably gate valves. Both discharge valves 26 and recirculation valve 38 are preferably controlled through solenoids by timing device 18. Preferably, fluid is pumped through both recirculation conduit 37 and discharge conduit 25 by a single pump such as centrifugal pump 21 shown in FIG. 7.

Recirculation valve 38 and discharge valve 26 may be replaced by a single three-way valve, not shown in the drawings. While the recirculation means is operating, the three-way valve would be selectively open to permit fluid to flow through recirculation conduit 37 while being selectively closed to prevent fluid from flowing through discharge conduit 25. While the discharge means is operating, the three-way valve would be selectively open to permit fluid to flow through discharge conduit 25 while being selectively closed to prevent fluid from flowing through recirculation conduit 37. While the cleaning means is operating, the three-way valve may be selectively open to permit fluid to flow simultaneously through both discharge conduit 25 and recirculation conduit 37.

Starch cooking and dispensing apparatus 1 further provides a means for dispensing dry starch into the water in reservoir 2 to form a starch suspension. To prevent the formation of lumps, starch is preferably added to the water in reservoir 2 either simultaneously or shortly after the means for agitating the water has been activated so that the water is being agitated as the dry starch is added. The dry starch that is used is an uncooked ("pearl") starch.

The means for dispensing dry starch into the water in reservoir 2 may be the manual addition of a premeasured quantity of dry starch directly into the water in reservoir 2. Alternatively, means for dispensing dry starch into reservoir 2 comprises the manual addition of dry starch into inlet chute 14 attached to the reservoir as shown in FIG. 5. The chute may further comprise a door (not shown in the drawings) hingedly connected to inlet chute 14 for temporarily closing inlet chute 14 when dry starch is not being dispensed.

Preferably, as depicted in FIG. 4 the means for dispensing dry starch into the water in reservoir 2 comprises powdered product dispenser 13 associated with the reservoir for automatically dispensing dry starch into the reservoir when a batch of starch solution is required. Such automatic powdered product dispensers are readily available commercially. Powdered product dispenser 13 may be controlled by timing device 18. When timing device 18 receives a signal from the commercial laundry machine, it relays that signal to powdered product dispenser 13 causing starch to be dispensed into the water in reservoir 2.

An example of an automatic powdered product dispenser is depicted in FIG. 4. As depicted in FIG. 4, powdered product dispenser 13 may comprise dry starch 4 reservoir 29 which is connected to reservoir 2 by dry starch inlet chute 30. Dry starch is dispensed by the rotating motion of screw-action dispenser 32 which is rotated by dry starch motor 33 through the use of gears 34 and 35. Dry starch propeller 31 is connected to and rotates with screw-action dispenser 32 for mixing the dry starch as it is dispensed to minimize caking. Preferably, powdered product dispenser 13 further comprises dry starch solenoid 36 which is an electrically energized solenoid responsive to timing device 18 and connected to dry starch motor 33. Dry starch solenoid 36 starts dry starch motor 33 when it receives a signal from timing device 18 in response to the signal received by timing device 18 from the commercial laundry machine. Timing device 18 measures the time required for the desired amount of dry starch to be dispensed into reservoir 2 and, at the end of the required time, signals dry starch solenoid 36 which then stops dry starch motor 33.

Starch cooking and dispensing apparatus 1 further comprises means for heating the starch suspension to dissolve the starch to create a starch solution. This process of dissolving the starch, referred to in the laundry trade as "cooking" the starch, changes the milky, partially opaque starch suspension into a clear or nearly clear starch solution. As depicted in FIG. 1, the means for heating the starch suspension comprises a source of steam, steam inlet conduit 16 connecting reservoir 2 with the steam source, and steam inlet valve 17 connected to steam inlet conduit 16 for selectively opening to permit steam to flow into the starch suspension or closing to prevent the flow of steam into the starch suspension.

Preferably, the means for heating the starch suspension further comprises timing device 18, thermostat 19, and steam inlet solenoid 20. Timing device 18, which is preferably a microprocessor, is associated with starch cooking and dispensing apparatus 1 for measuring the length of time the dry starch has been mixed with the water to form a starch suspension. After the water has begun agitating in reservoir 2 and the dry starch added, the starch should be agitated with the water for about 5–15 seconds before steam inlet valve 17 opens to permit the flow of steam into the suspension. Thermostat 19 is associated with starch cooking and dispensing apparatus 1 for determining when the heated starch solution has reached a predetermined temperature which should be approximately 180° to 195° F. for cooking the starch and changing the starch suspension to a starch solution. Steam inlet solenoid 20 is an electrically energized solenoid connected to steam inlet vane 17 and responsive to timing device 18 and thermostat 19 for opening steam inlet valve 17 when timing device 18 signals the end of a predetermined starch suspension mix time period, and for closing steam inlet vane 17 when thermostat 19 determines that the heated starch solution has reached the predetermined temperature of approximately 180° to 195° F. Thermostat 19 is preferably affixed to reservoir 2 with what is commonly referred to as a "JB weld."

Preferably, a filtering device, not shown in the drawings, is included in the steam line before steam inlet valve 17 to filter out slag and other debris that might cause steam inlet valve 17 to malfunction. Additionally, to prevent sticking of steam inlet valve 17 and to permit faster cooking of the starch, it is preferable to use steam at approximately 125 PSI.

Preferably, steam inlet conduit 16 is connected to steam diffusion head 28 on the inside of reservoir 2 so that all the steam entering the starch suspension/solution is diffused first through steam diffusion head 28. As shown in FIGS. 1, 6 and 7, steam diffusion head 28 may be a circular conduit, like sprayer 9 shown in FIGS. 1 and 2, having a plurality of pores through which the steam passes.

Starch cooking and dispensing apparatus 1 further comprises means for dispensing the cooked starch solution from reservoir 2 to the commercial laundry machine. The means for dispensing the cooked starch solution may comprise pumping means that may include electrically-driven, centrifugal pump 21 having pump inlet 22 and pump outlet 23. Pump inlet 22 is connected to drain 3 by pump inlet conduit 24. Pump outlet 23 is connected to the commercial laundry machine by discharge conduit 25. Discharge valve 26 is connected to discharge conduit 25 selectively opening to permit the starch solution to flow from the pump to the commercial laundry machine or closing to prevent the starch solution from flowing from the pump to the commercial laundry machine.

As shown in FIGS. 1 and 6, pump 21 may be driven by the same electric motor 12 that moves rotatable shaft 10 and propeller 11. In that case, rotatable shaft 10 is connected, for example by welding, to the top of the impellers for pump 21 which is a centrifugal pump. As in FIG. 7, where the agitation means utilizes recirculation conduit 37, pump 21 used for discharging the cooked starch solution may also be used for recirculating the starch for agitation. Recirculation valve 38 may selectively open to permit fluid to flow through recirculation conduit 37 while discharge valve 26 is selectively closed to prevent fluid from flowing through discharge conduit 25. During discharge, discharge valve 26 is selectively open to permit fluid to flow through discharge conduit 25 while recirculation valve 38 is selectively closed to prevent fluid from flowing through recirculation conduit 37. For cleaning, discharge valve 26 may be selectively open to permit fluid to flow through discharge conduit 25 while recirculation valve 38 is also selectively open to permit fluid to flow through recirculation conduit 37. Alternatively, discharge valve 26 may be a three-way valve as discussed above.

Discharge valve 26 may be operated manually. The operator may open discharge valve 26 when the operator determines that the temperature of the starch solution has reached the desired temperature between 180° and 195° F. or when starch is required by the commercial laundry machine and close discharge valve 26 after the starch solution has discharged. Preferably, discharge valve 26 remains open for a premeasured time after the discharge of the starch solution so that water from water supply conduit 5 continues to enter through sprayer 9 to clean reservoir 2 while the starch solution is being discharged and for a short time after the solution has been discharged so that sufficient clean water passes through discharge conduit 25 to clean all parts of starch cooking and dispensing apparatus 1 between water supply conduit 5 and the commercial laundry machine.

Preferably, the means for discharging the cooked starch solution from reservoir 2 into the commercial laundry machine further comprises timing device 18, thermostat 19 and means for opening discharge valve 26 when the starch solution has reached a certain temperature, preferably between 180° to 195° F., and for closing discharge valve 26 after discharge valve 26 has been open for a predetermined period of time. The predetermined period of time is calculated based on the length of time required for the starch solution in reservoir 2 to discharge through discharge valve 26 plus an additional period of time for permitting clean water to flow through starch cooking and dispensing apparatus 1 to clean it. The means for opening and closing discharge valve 26 may include pump discharge solenoid 27. Pump discharge solenoid 27 is an electrically energized solenoid connected to discharge valve 26 and responsive to thermostat 19 for opening discharge valve 26 when the temperature of the starch solution reaches a predetermined temperature and responsive to timing device 18 for closing discharge valve 26 when timing device 18 signals that the discharge valve has been open for a predetermined period of time.

Alternatively, the means for dispensing the cooked starch solution from reservoir 2 into the commercial laundry machine further comprises only timing device 18 and means for opening discharge valve 26 when the commercial laundry machine has signaled for the discharge of the starch solution and for closing discharge valve 26 after discharge valve 26 has been open for a predetermined period of time sufficient to discharge the starch solution and to rinse clean the apparatus. The means for opening and closing discharge valve 26 may include pump discharge solenoid 27. Pump discharge solenoid 27 is an electrically energized solenoid connected to discharge valve 26 and responsive to timing device 18 for opening discharge valve 26 after timing device 18 has received a signal from the commercial laundry machine calling for the starch discharge and responsive to timing device 18 for closing discharge valve 26 when the timing device signals that the discharge valve has been open for a predetermined period of time sufficient to permit the starch solution to be discharged and further permit the apparatus to be rinsed by clean water. In this alternative, timing device 18 includes a microprocessor and a plurality of relays. The microprocessor measures time, receives and processes signals from the commercial laundry machine, and communicates with the plurality of relays for controlling one or more functions of starch cooking and dispensing apparatus 1.

Where agitation includes recirculation conduit 37, as depicted in FIG. 7, valve 26 may be selectively open permitting water to flow through both the discharge conduit and the recirculation conduit simultaneously after the batch of starch solution is substantially discharged to permit rinse water to clean residual starch from both the discharge conduit and the recirculation conduit. In this configuration, the discharge means continues operating for a predetermined time after the starch solution is substantially discharged. At the same time that the filling means begins to operate, valve 26 selectively opens to permit flow simultaneously through both recirculation conduit 37 and discharge conduit 25 to rinse therefrom the residual starch. As with other configurations of the invention, valve 26 is preferably controlled by timing device 18, as discussed above.

The apparatus of the invention is designed for cooking and dispensing consecutive single batches of starch. In the preferred mode of operation using the embodiment shown in FIG. 7, motor 12 is operating at all times that the apparatus is operating. When reservoir 2 is substantially filled with water, the probe in the top portion of reservoir 2, not shown in the drawings, signals timing device 18, a microprocessor timing device, which sends a signal to recirculation solenoid 39 which opens recirculation valve 38 so that fluid is pumped by centrifugal pump 21 through recirculation conduit 37.

At approximately the same time, timing device 18 sends a signal to powdered product dispense 13 which dispenses dry starch into reservoir 2. After a time delay sufficient for mixing the dry starch with water to form a starch suspension, timing device 18 sends a signal to steam inlet solenoid 20 which opens steam inlet valve 17 so that steam enters reservoir 2 to cook the starch. When the temperature reaches the optimal temperature, thermostat 19 sends a signal to timing device 18 which, in turn, sends a signal to recirculation solenoid 39 for closing recirculation valve 38 a also sends a signal to discharge solenoid 27 for opening discharge valve 26. The entire batch of starch solution is discharged through discharge conduit 25 to the commercial laundry machine.

When the probe at the bottom portion of reservoir 2 detects that reservoir 2 is substantially empty, the probe sends a signal to water supply solenoid 8 for opening water supply valve 6 causing water to be sprayed into reservoir 2 to clean it. AT the same time that a signal is sent to open water supply valve 6, a signal may be sent to open recirculation valve 38 for cleaning. After discharge valve 26 has been open for a predetermined time following discharge of the starch solution, timing device 18 sends a signal to discharge solenoid 27 for closing discharge valve 26 while recirculation valve 38 remains selectively open to permit flow through recirculation conduit 37 which begins the agitation. Starch is then dispensed into reservoir 2 and, after a predetermined time for agitation, the heating means begins and the cycle continues.

According to the invention, a method of cooking and dispensing consecutive single batches of starch solution is presented whereby reservoir 2 is substantially filled with water. Agitation begins and dry starch is dispensed into reservoir 2 to form a starch suspension. Agitation continues while the starch is heated to form a single batch of starch solution. The entire batch of starch solution is discharged in one discharge to one or more commercial laundry machines. If the starch is to be dispensed simultaneously to more than one commercial laundry machine, the machines must be synchronized so that they all are on the cycle that calls for starch at the time the starch is discharged. When substantially all the starch is discharged, the cleaning step begins whereby residual starch is rinsed from the reservoir.

The agitation step may be accomplished by rotation of propeller 11 or may comprise recirculating water and starch through the reservoir by means of recirculating conduit 37. The cleaning step may comprise spraying water into reservoir 2 while the discharge means is continuing to operate so as to flush residual starch from reservoir 2 through discharge conduit 25 and into the commercial laundry machine.

If the agitation step is accomplished by recirculating the starch and water, then the cleaning step may include operating the recirculating means while water is sprayed into reservoir 2 and being discharged so as to rinse residual starch from recirculation conduit 37. After rinsing, discharge valve 26 selectively closes to prevent fluid from flowing through discharge conduit 25. The water spray into reservoir 2 continues and fills reservoir 2 to begin preparation of another batch of starch.

While it is preferable that the cleaning or rinsing step be included after the preparation of each single batch of starch, it may be performed only after discharge of a predetermined number of batches, or as needed. Preferably, the cleaning step will be performed at the end of each day to prevent fouling of the starch.

Starch cooking and dispensing apparatus 1 may have an insulating jacket (not shown in the drawings) wrapped around reservoir 2 to prevent heat loss and to muffle the sounds that may be made by the operation of the apparatus.

Although the present invention has been shown and described with respect to preferred embodiments, various changes and modifications which are obvious to a person skilled in the art to which the invention pertains are deemed to lie within the spirit and scope of the invention.

What is claimed is:

1. An apparatus for cooking consecutive single batches of a predetermined quantity of liquid starch solution and dispensing each entire single batch of solution into a commercial laundry machine, comprising:
   a. a reservoir having capacity for holding a single batch of starch solution, the reservoir having sidewalls, a top portion, a bottom portion, and a drain;
   b. filling means including a conduit in communication with a source of water for substantially filling the reservoir with water;
   c. recirculation means including a recirculation conduit extending from the bottom portion of the reservoir to the top portion of the reservoir for agitating the water in the reservoir by recirculating the water from the bottom portion through the recirculation conduit and back into the top portion of the reservoir;
   d. means for dispensing dry starch into the water in the reservoir to form a starch suspension;
   e. means for heating the starch suspension to dissolve the starch to create a starch solution;
   f. discharge means for and dispensing the entire batch of starch solution from the reservoir through the drain into the commercial laundry machine; and
   g. the filling means having spraying means inside the reservoir for spraying water onto the sidewalls while the discharge means is operating, for washing the sidewalls of starch solution.

2. The apparatus of claim 1, wherein the spraying means comprises a sprayer conduit extending around an inside perimeter of the reservoir adjacent the top portion of the reservoir.

3. The apparatus of claim 1, wherein the means for dispensing dry starch into the water in the reservoir comprises a powdered product dispenser associated with the reservoir for automatically dispensing dry starch into the reservoir when a batch of starch solution is required.

4. The apparatus of claim 1, wherein the means for dispensing the dry starch into the water in the reservoir comprises the manual addition directly into the reservoir of a premeasured quantity of dry starch.

5. The apparatus of claim 1, wherein the means for heating the starch suspension to cook the starch comprises:
   a. a source of steam;
   b. a conduit connecting the reservoir with the steam source;
   c. a steam inlet valve connected to the conduit for selectively opening to permit steam to flow into the starch suspension or closing to prevent the flow of steam into the starch suspension.

6. The apparatus of claim 5 further including:
   a. a timing device associated with the starch cooking apparatus for measuring the length of time the dry starch has been agitated with the water to form a starch solution;
   b. a thermostat associated with the starch cooking apparatus for determining when the heated starch solution has reached a predetermined temperature; and
   c. an electrically energized solenoid connected to the steam inlet valve and responsive to the timing device and the thermostat for opening the steam inlet valve when the timing device signals the end of a predetermined starch solution mix time period, and for closing the steam inlet valve when the thermostat determines that the heated starch solution has reached the predetermined temperature.

7. The apparatus of claim 1, wherein the recirculation means and the discharge means comprise:
   a. a pump having a pump inlet and a pump discharge;
   b. a pump inlet conduit in communication with the drain of the reservoir;
   c. a discharge conduit connecting the pump discharge to the laundry machine;
   d. the recirculation conduit being in communication with the pump discharge and having a recirculation valve selectively opening to permit fluid to flow from the bottom portion of the reservoir through the pump to the top portion of the reservoir to agitate the fluid;
   e. a discharge valve in the discharge conduit selectively opening to permit starch solution to flow from the pump to the laundry machine and selectively closing to prevent the flow of starch solution from the pump to the laundry machine.

8. The apparatus of claim 7, further comprising:
a. a thermostat associated with the starch cooking and dispensing apparatus for determining when the heated starch solution has reached a predetermined temperature;
b. a timing device associated with the starch cooking and dispensing apparatus for measuring the length of time the discharge valve has been open; and
c. an electrically energized solenoid connected to the discharge valve and responsive to the thermostat and the timing device for opening the discharge valve when the thermostat signals that the heated starch solution has reached a predetermined temperature and closing the discharge valve when the timing device signals that the discharge valve has been open for a predetermined period of time.

9. The apparatus of claim 8, wherein the predetermined period of time is calculated to permit the discharge of the starch solution and the discharge of additional clean water to the spraying means to clean the reservoir, the pump inlet conduit, the discharge valve and the discharge conduit.

10. The apparatus of claim 7, further comprising:
a. timing device including a plurality of relays associated with the apparatus for measuring the length of time the discharge valve has been open and for receiving and relaying a signal from the commercial laundry machine;
b. an electrically energized solenoid connected to the discharge valve and responsive to the timing device for opening the discharge valve when the timing device receives and relays the signal from the commercial laundry machine and closing the discharge valve when the timing device signals that the discharge valve has been open for a predetermined period of time.

11. The apparatus of claim 10, wherein the predetermined period of time is calculated to permit the discharge of the starch solution and the discharge of additional clean water to the spraying means to clean the reservoir, the pump inlet conduit, the discharge valve and the discharge conduit.

12. An apparatus for cooking consecutive single batches of a predetermined quantity of liquid starch solution and dispensing each entire single batch of solution into a commercial laundry machine, comprising:
a. a reservoir having capacity for holding a single batch of starch solution, the reservoir having sidewalls, a top portion, a bottom portion, and a drain;
b. filling means for substantially filling the reservoir with water;
c. a recirculation conduit extending from the drain back to the top portion of the reservoir;
d. means for dispensing dry starch into the water in the reservoir to form a starch suspension;
e. means for heating the starch suspension to dissolve the starch to create a starch solution;
f. a discharge conduit in communication with the recirculation conduit and with a commercial laundry machine;
g. a pump having a pump inlet connected to the drain and having a pump outlet connected to the recirculation conduit;
h. valve means for the recirculation conduit and for the discharge conduit for selectively permitting the starch solution to flow from the drain, through the pump and through the recirculation conduit to the top portion of the reservoir to agitate the solution preventing the solution from flowing through the discharge conduit, and for selectively permitting starch solution to flow through the pump and through the discharge conduit for dispensing the entire batch of starch solution into the commercial laundry machine while being selectively closed to prevent the starch solution from flowing through the recirculation conduit; and
i. the filling means having spraying means inside the reservoir for spraying water onto the sidewalls for washing the sidewalls of starch solution while the starch solution is flowing through the discharge conduit to the laundry machine.

13. The apparatus of claim 12, wherein the valve means comprises:
a. a recirculation valve in the recirculation conduit selectively opening to permit fluid to flow through the recirculation conduit to agitate the fluid while being selectively closed to prevent fluid from flowing through the discharge conduit to the commercial laundry machine; and
b. a discharge valve in the discharge conduit selectively opening to permit fluid to flow from the pump to the laundry machine, while the recirculation valve is selectively closed to prevent fluid from flowing through the recirculation conduit, and selectively closing to prevent fluid from flowing through the discharge conduit to the laundry machine while the recirculation valve is selectively open to permit fluid to flow through the recirculation conduit.

14. An apparatus for cooking a single batch of a predetermined quantity of liquid starch solution and dispensing the entire single batch of solution to a commercial laundry machine comprising:
a. a reservoir having capacity for holding a single batch of starch solution, the reservoir having sidewalls, a top portion, a bottom portion, and a drain in communication with the laundry machine;
b. means for substantially filling the reservoir with water;
c. a cyclically movable stirring device having a rotatable shaft extending into the reservoir at an angle substantially perpendicular to the sidewalls and a blade attached to the shaft for agitating the water in the reservoir when rotated by the shaft;
d. means for dispensing dry starch into the water in the reservoir to form a starch suspension;
e. means for heating the starch suspension to dissolve the starch to create a starch solution;
f. discharge means for and dispensing the entire batch of starch solution from the reservoir through the drain into the commercial laundry machine; and
g. spraying means inside the reservoir and in fluid flow communication with the conduit connecting the reservoir with the source of water for spraying water onto the sidewalls while the discharge means is operating, for washing the sidewalls of starch solution.

15. The apparatus of claim 14, wherein the discharge means comprises:
a. a discharge pump mounted to the drain, the discharge pump having an impeller mounted to the shaft of the stirring device for rotation therewith;
b. a motor connected to the shaft of the stirring device for rotating the shaft and the impeller of the pump simultaneously; and
c. discharge valve means downstream of the discharge pump for opening the drain to cause the discharge pump to discharge the entire batch of starch solution to the laundry machine.

16. A method of cooking a single batch of starch and dispensing the entire batch into a commercial laundry machine comprising:

a. filling a reservoir substantially full with water;

b. agitating the water in the reservoir;

c. dispensing dry starch into the water in the reservoir to form a starch suspension;

d. heating the starch suspension to dissolve the starch to create a batch of starch solution;

e. discharging the entire batch of starch solution in a single discharge to the laundry machine; and f. cleaning the starch solution from the reservoir.

17. The method of claim 16, wherein the agitating step comprises recirculating water through the reservoir by means of a recirculating conduit.

18. The method of claim 16, wherein the cleaning step comprises spraying water into the reservoir while the discharge step is continuing so as to clean residual starch from the reservoir flushing the residual starch into the laundry machine.

19. The method of claim 17, wherein the cleaning step comprises spraying water into the reservoir while the discharge and agitating steps are continuing so as to clean residual starch from the reservoir and the recirculating conduit flushing the residual starch into the laundry machine.

20. A method of cooking a single batch of starch and dispensing the entire batch into a commercial laundry machine comprising:

a. filling a reservoir substantially full with water;

b. agitating the water in the reservoir by recirculating water through the reservoir by means of a recirculating conduit;

c. dispensing dry starch into the water in the reservoir to form a starch suspension;

d. injecting steam into the water in the reservoir to cook the starch suspension to form a batch of starch solution;

e. discharging the entire batch of starch solution in a single discharge to the laundry machine; and f. spraying water into the reservoir while the discharge and agitating steps continue so as to clean residual starch from the reservoir and the recirculating conduit flushing the residual starch into the laundry machine.

* * * * *